United States Patent
Kikuchi et al.

(10) Patent No.: US 9,070,916 B2
(45) Date of Patent: Jun. 30, 2015

(54) METHOD FOR CONTROLLING FUEL CELL SYSTEM

(75) Inventors: Go Kikuchi, Wako (JP); Koichiro Miyata, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 587 days.

(21) Appl. No.: 13/423,277

(22) Filed: Mar. 19, 2012

(65) Prior Publication Data

US 2012/0251911 A1   Oct. 4, 2012

(30) Foreign Application Priority Data

Apr. 1, 2011   (JP) .................................. 2011-082085

(51) Int. Cl.
H01M 8/04 (2006.01)

(52) U.S. Cl.
CPC ........ *H01M 8/04761* (2013.01); *H01M 8/0494* (2013.01); *H01M 8/04955* (2013.01); *H01M 8/04753* (2013.01); *Y02E 60/50* (2013.01)

(58) Field of Classification Search
None
See application file for complete search history.

(56) References Cited

U.S. PATENT DOCUMENTS

| 8,691,460 | B2* | 4/2014 | Matsumoto et al. | 429/429 |
| 2005/0233191 | A1* | 10/2005 | Ushio | 429/22 |
| 2007/0092771 | A1* | 4/2007 | Wake et al. | 429/22 |
| 2010/0151290 | A1* | 6/2010 | Ueda et al. | 429/13 |
| 2010/0209793 | A1* | 8/2010 | Kamiyama et al. | 429/429 |

FOREIGN PATENT DOCUMENTS

| JP | 2004-22487 | 1/2004 |
| JP | 2008257984 A * | 10/2008 |

OTHER PUBLICATIONS

JP2008257984A.*

* cited by examiner

*Primary Examiner* — Patrick Ryan
*Assistant Examiner* — Lucas J O'Donnell
(74) *Attorney, Agent, or Firm* — Mori & Ward, LLP

(57) ABSTRACT

A method includes: determining whether or not an elapsed time since stopping of power generation of a fuel cell until an operation start instruction to start a fuel cell system is detected is shorter than a specified time, if the operation start instruction to start the fuel cell system is detected after the power generation of the fuel cell is stopped; setting, as a first amount, an amount of replacement of a fuel gas on an anode side, if it is determined that the elapsed time is shorter than the specified time; and setting, as a second amount, an amount of replacement of the fuel gas on the anode side, if it is determined that the elapsed time is longer than the specified time. The first amount is larger than the second amount.

6 Claims, 9 Drawing Sheets

METHOD FOR CONTROLLING FUEL CELL SYSTEM

CROSS-REFERENCE TO RELATED APPLICATIONS

The present application claims priority under 35 U.S.C. §119 to Japanese Patent Application No. 2011-082085, filed Apr. 1, 2011, entitled "Control Method for Fuel Cell System". The contents of this application are incorporated herein by reference in their entirety.

BACKGROUND OF THE INVENTION

1. Field of the Invention

The present invention relates to a method for controlling a fuel cell system.

2. Discussion of the Background

A fuel cell system acquires DC electric energy according to an electrochemical reaction of a fuel gas (gas essentially containing hydrogen, such as hydrogen gas) and an oxide gas (gas essentially containing oxygen, such as air) respectively supplied to an anode electrode and a cathode electrode. This system is of a stationary type, or is mounted in a fuel cell vehicle as an on-vehicle fuel cell system.

For example, a solid polymer fuel cell has an electrolyte membrane/electrode assembly (MEA) having an anode electrode and a cathode electrode provided on the respective side of an electrolyte membrane formed by a polymer ion-exchange film; the electrolyte membrane/electrode assembly is sandwiched by a pair of separators. A fuel gas passage for supplying a fuel gas to the anode electrode is formed between one of the separators and the electrolyte membrane/electrode assembly. An oxide gas passage for supplying an oxide gas to the cathode electrode is formed between the other separator and the electrolyte membrane/electrode assembly.

When the fuel cell is stopped, supply of the fuel gas and oxide gas is stopped. However, the fuel gas remains in the fuel gas passage, and the oxide gas remains in the oxide gas passage. When the operation-stop period of the fuel cell becomes long, therefore, the fuel gas and the oxide gas may pass through the electrolyte membrane, so that the fuel gas is mixed with the oxide gas to react therewith, thereby deteriorating the electrolyte membrane/electrode assembly.

To cope with the problem, when the operation of the fuel cell is stopped, a fuel cell system disclosed in, for example, Japanese Unexamined Patent Application Publication No. 2004-22487 (FIG. 1 and paragraph [0029]) executes what is called an in-stop-mode power generating process of shutting off the supply of a reaction gas to the anode side, and reducing the supply of the reaction gas to the cathode side to maintain power generation, thereby charging a battery with the generated power. The in-stop-mode power generating process causes hydrogen to be consumed on the anode side, and causes oxygen to be consumed on the cathode side, thereby filling the cathode side with a nitrogen gas. This suppresses deterioration of the fuel cell system at the time of soaking after the operation of the fuel cell is stopped.

SUMMARY OF THE INVENTION

According to one aspect of the present invention, a method is for controlling a fuel cell system having a fuel cell to generate power according to an electrochemical reaction of an oxide gas supplied to a cathode side with a fuel gas supplied to an anode side, an oxide-gas supply apparatus to supply the oxide gas to the fuel cell, and a fuel-gas supply apparatus to supply the fuel gas to the fuel cell. The method includes: an in-stop-mode power generating process of, if an operation stop instruction to stop an operation of the fuel cell is detected, stopping supply of the fuel gas to the fuel cell from fuel-gas supply apparatus, supplying the oxide gas to the fuel cell from the oxide-gas supply apparatus, and stopping power generation of the fuel cell; determining whether or not an elapsed time since the stopping of the power generation of the fuel cell until an operation start instruction to start the fuel cell system is detected is shorter than a specified time, if the operation start instruction to start the fuel cell system is detected after the power generation of the fuel cell is stopped; setting, as a first amount, an amount of replacement of the fuel gas on the anode side at a time of starting the fuel cell system, if it is determined that the elapsed time is shorter than the specified time; and setting, as a second amount, an amount of replacement of the fuel gas on the anode side at the time of starting the fuel cell system, if it is determined that the elapsed time is longer than the specified time. The first amount is larger than the second amount.

According to another aspect of the present invention, a method is for controlling a fuel cell system having a fuel cell to generate power according to an electrochemical reaction of an oxide gas supplied to a cathode side with a fuel gas supplied to an anode side, an oxide-gas supply apparatus to supply the oxide gas to the fuel cell, a fuel-gas supply apparatus to supply the fuel gas to the fuel cell, and a scavenging apparatus to execute an in-soak-mode scavenging gas replacing process of scavenging the anode side with a scavenging gas at a time of soaking after power generation of the fuel cell is stopped. The fuel cell system is configured to execute an upon-startup fuel gas replacing process of supplying the fuel gas to the anode side to discharge an anode-off gas when the fuel cell is started. The method includes: determining whether an in-stop-mode power generating process is executed since an operation stop instruction to stop an operation of the fuel cell is detected until the fuel cell system is stopped, the in-stop-mode power generating process including stopping supply of the fuel gas, stopping supply of the oxide gas to the fuel cell to generate power from the oxide-gas supply apparatus after the stopping of supply of the fuel gas, and stopping power generation of the fuel cell after the stopping of supply of the oxide gas; setting, as a first amount, an amount of the fuel gas to be used in case of executing the upon-startup fuel gas replacing process before an in-soak-mode scavenging gas replacing process is executed by the scavenging apparatus when it is determined that the in-stop-mode power generating process is executed, if the operation stop instruction to stop the operation of the fuel cell is detected; and setting, as a second amount, an amount of the fuel gas to be used in case of executing the upon-startup fuel gas replacing process before the in-soak-mode scavenging gas replacing process is executed by the scavenging apparatus when it is determined that the in-stop-mode power generating process is not executed, if the operation stop instruction to stop the operation of the fuel cell is detected. The first amount is larger than the second amount.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
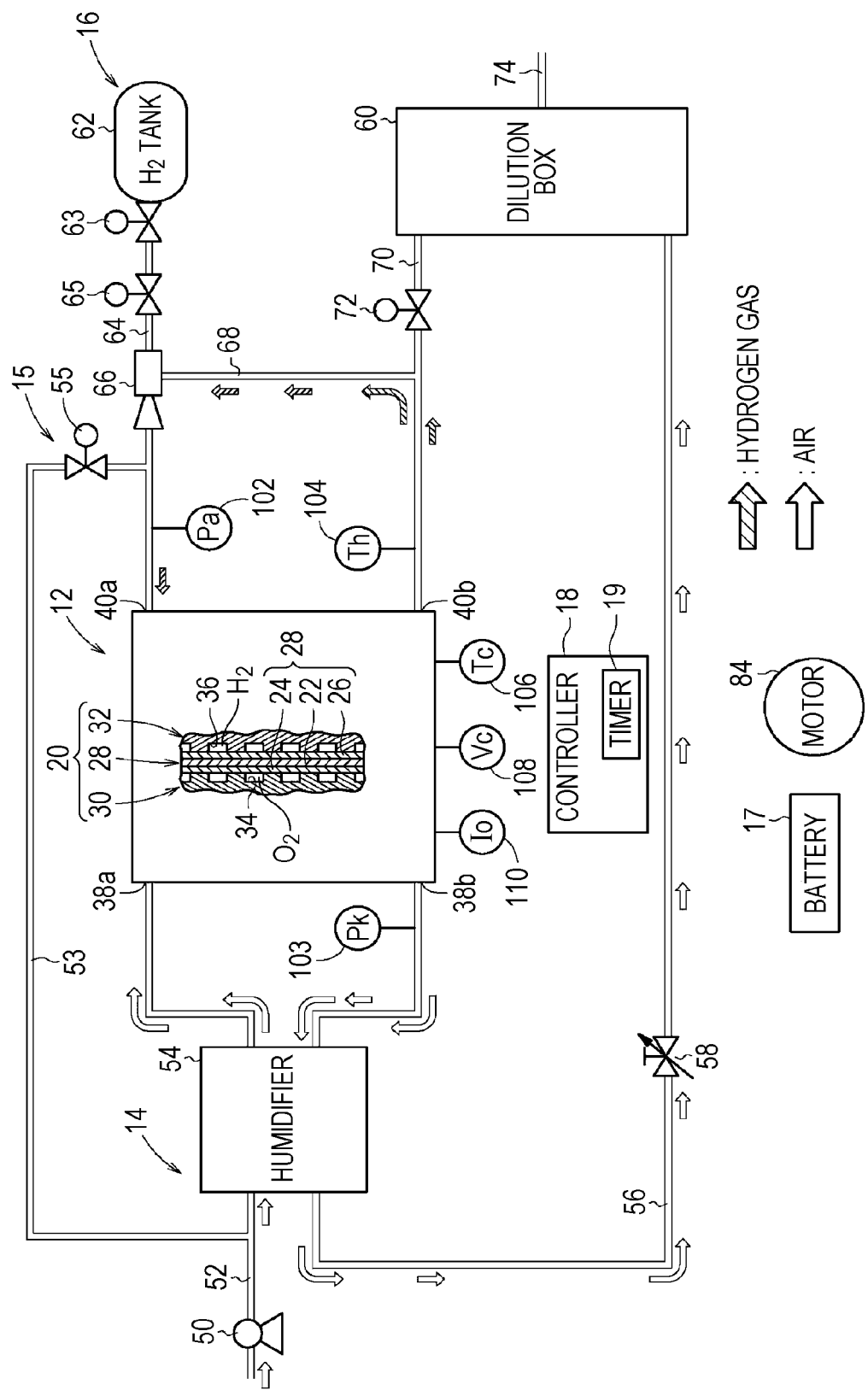
FIG. 1 is a schematic configurational diagram of a fuel cell system which is a target of an operation stopping method according to an exemplary embodiment of the disclosure.

The embodiments will now be described with reference to the accompanying drawings, wherein like reference numerals designate corresponding or identical elements throughout the various drawings.

As shown in FIG. 1, a fuel cell system 10 which is a target of an operation stopping method according to an exemplary embodiment of the disclosure includes a fuel cell stack 12, an oxide-gas supply apparatus 14 that supplies an oxide gas to the fuel cell stack 12, a scavenging apparatus 15 that supplies a replacement gas to the fuel cell stack 12, a fuel-gas supply apparatus 16 that supplies a fuel gas to the fuel cell stack 12, a battery (electric storage device) 17 connectable to the fuel cell stack 12, and a controller (control apparatus, control unit) 18 that performs the general control of the fuel cell system 10.

The controller 18 is a computer including a microcomputer, and has a CPU (Central Processing Unit), a ROM (including EEPROM) as a memory, a RAM (Random Access Memory), input/output units, such as an A/D converter and a D/A converter, and a timer 19 serving as a clock or time-measuring unit. When the CPU reads a program stored in the ROM and executes it, the controller 18 functions as various functional parts, such as a control unit, an arithmetic operation unit, and a processing unit.

The fuel cell system 10 is mounted in a fuel cell vehicle like a fuel cell car. The battery 17 permits the fuel cell vehicle to run normally, and has a capacity of 20 A and as high as about 500 V, a higher voltage and higher capacity than a 12-V power supply 98 to be described later.

The fuel cell stack 12 has a stack of a plurality of fuel cells (also called "cells" or "cell pairs") 20. Each fuel cell 20 includes an electrolyte membrane/electrode assembly (MEA) 28 which has a solid polymer electrolyte membrane 22 sandwiched between a cathode electrode 24 and an anode electrode 26. The solid polymer electrolyte membrane 22 is formed by a thin film of perfluorosulfone impregnated with water.

The cathode electrode 24 and the anode electrode 26 each have a gas diffusion layer formed by carbon paper or the like, and an electrode catalyst layer formed by applying porous carbon particles each carrying a platinum alloy (or Ru or the like) on its surface to the surface of the gas diffusion layer uniformly. The electrode catalyst layer is formed on both sides of the solid polymer electrolyte membrane 22.

The electrolyte membrane/electrode assembly 28 is sandwiched by a cathode-side separator 30 and an anode-side separator 32. The cathode-side separator 30 and anode-side separator 32 are made of, for example, carbon or a metal.

An oxide gas passage 34 is provided between the cathode-side separator 30 and the electrolyte membrane/electrode assembly 28. A fuel gas passage 36 is provided between the anode-side separator 32 and the electrolyte membrane/electrode assembly 28.

The fuel cell stack 12 provided with an oxide-gas inlet hole 38a for supplying an oxide gas, e.g., an oxygen-containing gas (hereinafter also referred to as "air"), a fuel-gas inlet hole 40a for supplying a fuel gas, e.g., a hydrogen-containing gas (hereinafter also referred to as "hydrogen gas"), a coolant inlet hole (not shown) for supplying a coolant, an oxide-gas outlet hole 38b for discharging the oxide gas, a fuel-gas outlet hole 40b for discharging the fuel gas, and a coolant outlet hole (not shown) for discharging the coolant. The oxide-gas inlet hole 38a, the fuel-gas inlet hole 40a, the coolant inlet hole, the oxide-gas outlet hole 38b, the fuel-gas outlet hole 40b, and the coolant outlet hole communicate with one another in the stack direction of the fuel cells 20.

The oxide-gas supply apparatus 14 includes an air pump 50 that compresses atmospheric air and supplies it. The air pump 50 is disposed in an air supply passage 52. A humidifier 54 that exchanges moisture and heat between a supplied gas and an exhaust gas is disposed in the air supply passage 52. The air supply passage 52 communicates with the oxide-gas inlet hole 38a of the fuel cell stack 12.

The oxide-gas supply apparatus 14 further includes an air discharge passage 56 communicating with the oxide-gas outlet hole 38b. The air discharge passage 56 communicates with a humidifying-medium passage (not shown) of the humidifier 54. The air discharge passage 56 is provided with a back-pressure control valve (hereinafter also referred to simple as "back pressure valve") 58 whose degree of opening is adjustable, such as a butterfly valve, to adjust the pressure of air supplied to the fuel cell stack 12 from the air pump 50 via the air supply passage 52. The back-pressure control valve 58 is preferably a normally-closed control valve (which is closed when not energized). The air discharge passage 56 communicates with a dilution box 60.

The scavenging apparatus 15 includes the air pump 50, which is shared with the oxide-gas supply apparatus 14, an air inlet passage 53 provided between a hydrogen supply passage 64 downstream of an ejector 66 and the air supply passage 52, and an air inlet valve 55 disposed in the air inlet passage 53.

The air inlet valve 55 is an on-off valve which is opened at the time of what is called an anode-side air scavenging process (anode-side air replacing process) in order to supply compressed air from the air pump 50 to the fuel gas passage 36 through the fuel-gas inlet hole 40a via the air supply passage 52 and the air inlet passage 53.

The fuel-gas supply apparatus 16 includes a hydrogen tank 62 that stores high-pressure hydrogen and is integrally provided with an in-tank solenoid valve 63 which is an on-off valve. The hydrogen tank 62 communicates with the fuel-gas inlet hole 40a of the fuel cell stack 12 via the hydrogen supply passage 64.

The hydrogen supply passage 64 is provided with a shutoff valve 65 which is an on-off valve, and the ejector 66. The ejector 66 supplies the hydrogen gas supplied from the hydrogen tank 62 to the fuel cell stack 12 through the hydrogen supply passage 64, and sucks an exhaust gas containing an unused hydrogen gas, which has not been used in the fuel cell stack 12, from a hydrogen circulation path 68 and supplies the exhaust gas to the fuel cell stack 12 again as a fuel gas.

An off-gas passage 70 communicates with the fuel-gas outlet hole 40b. The hydrogen circulation path 68 communicates with a halfway portion of the off-gas passage 70, which is connected with the dilution box 60 via a purge valve 72. The outlet side of the dilution box 60 is connected with a discharge passage 74. The discharge passage 74 is provided with a storage buffer (not shown) to which an exhaust passage communicating with the atmosphere is connected.

The controller 18 acquires signals from a pressure sensor 102 provided in the hydrogen supply passage 64, a pressure sensor 103 provided in the vicinity of the oxide-gas outlet hole 38b, a temperature sensor 104 provided in the vicinity of the fuel-gas outlet hole 40b, a temperature sensor 106 provided in the coolant inlet hole (not shown), a voltage sensor 108, and a current sensor 110, and controls the ON (closing) and OFF (opening) actions of an FC contactor 86 to be described later, the opening/closing of and the degrees of opening of valves such as the shutoff valve 65, and controls an actuator for, for example, regulating the flow rate (airflow rate) of the air pump 50, based on the acquired signals. The pressure sensor 102 detects an anode pressure Pa. The pressure sensor 103 detects a cathode pressure Pk. The temperature sensor 104 detects a hydrogen temperature Th. The temperature sensor 106 detects a coolant temperature Tc. The voltage sensor 108 detects the voltage of each fuel cell 20 (called "cell voltage" or "cell pair voltage"). The current sensor 110 detects a current value Io of the current flowing out from the fuel cell stack 12.

Figure 2:
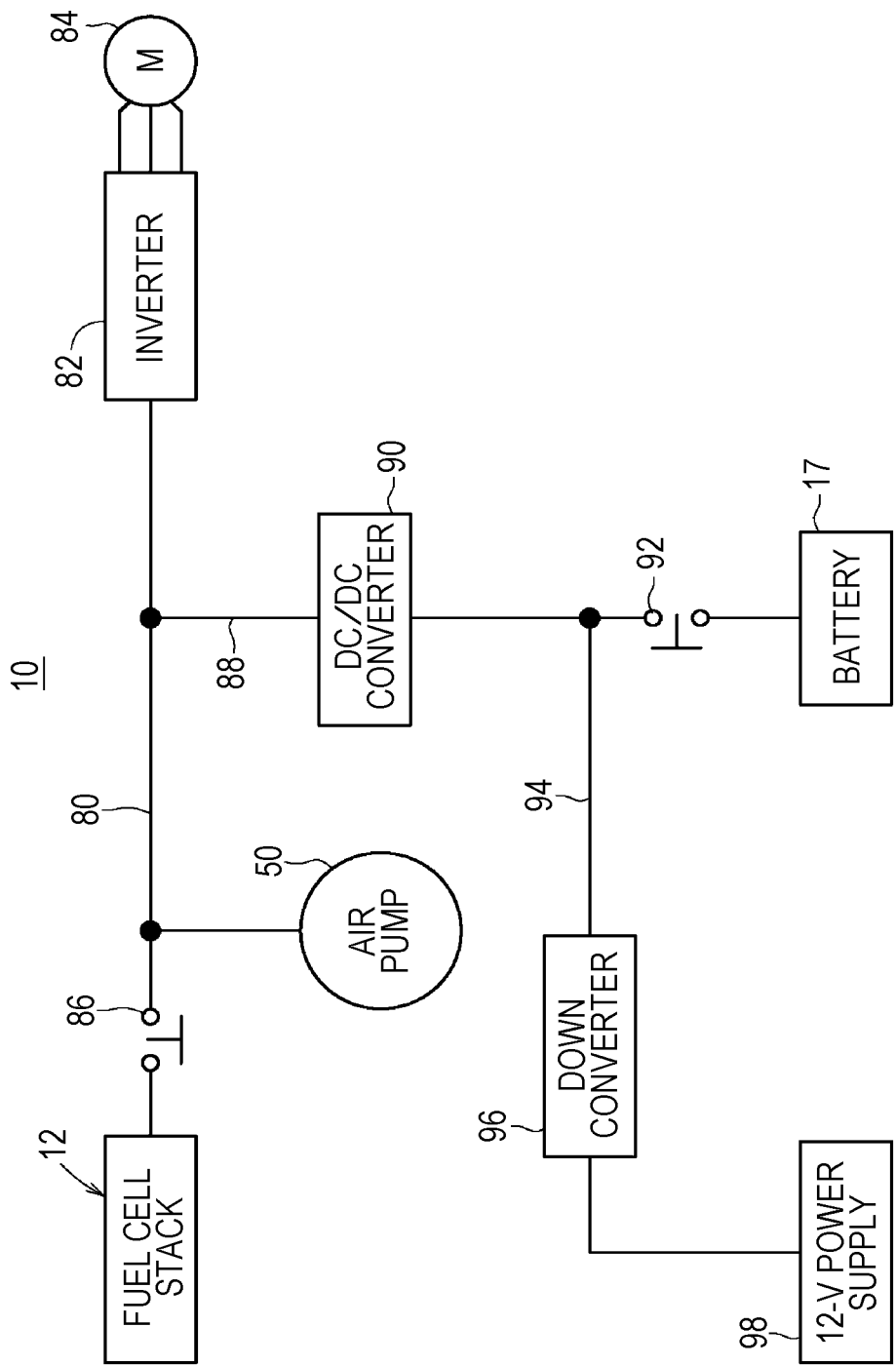
FIG. 2 is an explanatory diagram of circuits included in the fuel cell system.

As shown in FIG. 2, the fuel cell stack 12 is connected with one end of a main power line 80 whose other end is connected to an inverter 82. The inverter 82 is connected with a three-phase drive motor 84 for driving a vehicle. Substantially, two main power lines 80 are used, but are described as a single main power line 80 for the sake of descriptive convenience. The same is applied to other lines to be described hereinafter.

The main power line 80 is provided with the FC contactor (main-power-supply ON/OFF unit, fuel cell stack ON/OFF unit) 86, and is connected with the air pump 50. The main power line 80 is connected with one end of a power line 88 to which the battery 17 is connected via a DC/DC converter 90 and a battery contactor (electric-storage-unit ON/OFF unit) 92. The power line 88 is provided with a branched power line 94 to which the 12-V power supply 98 is connected via a down converter (DC/DC converter) 96. The voltage of the 12-V power supply 98 has only to be lower than the voltage of the battery 17, and is not limited to 12 V.

The operation of the fuel cell system 10 with the foregoing configuration will be described below.

First, at the time of the normal operation of the fuel cell system 10 (also referred to as "at the time of normal power generation" or "at the time of a normal power generating process"), air is supplied to the air supply passage 52 via the air pump 50 included in the oxide-gas supply apparatus 14. The air is humidified through the humidifier 54, and is supplied to the oxide-gas inlet hole 38a of the fuel cell stack 12. The air moves along the oxide gas passage 34, provided in each fuel cell 20 in the fuel cell stack 12, to be supplied to the cathode electrode 24.

The used air is discharged into the air discharge passage 56 from the oxide-gas outlet hole 38b, and is supplied to the humidifier 54 to humidify air newly supplied. The air is then supplied to the dilution box 60 via the back pressure valve 58.

When the in-tank solenoid valve 63 and the shutoff valve 65 in the fuel-gas supply apparatus 16 are opened, the hydrogen gas from the hydrogen tank 62 is depressurized by a depressurization control valve (not shown), and is then supplied to the hydrogen supply passage 64. The hydrogen gas is supplied to the fuel-gas inlet hole 40a of the fuel cell stack 12 through the hydrogen supply passage 64. The hydrogen gas supplied into the fuel cell stack 12 moves along the fuel gas passage 36 of each fuel cell 20 to be supplied to the anode electrode 26.

The used hydrogen gas is sucked by the ejector 66 from the fuel-gas outlet hole 40b via the hydrogen circulation path 68, and is supplied to the fuel cell stack 12 again as a fuel gas. Therefore, the air supplied to the cathode electrode 24 electrochemically reacts with the hydrogen gas supplied to the anode electrode 26 to generate power.

An impurity is likely to be mixed in the hydrogen gas that circulates in the hydrogen circulation path 68. Accordingly, the impurity-containing hydrogen gas is supplied to the dilution box 60 via the purge valve 72 opened. This hydrogen gas is mixed with an air-off gas in the dilution box 60 to reduce the hydrogen concentration, and is then discharged into the storage buffer (not shown).

During normal power generation, the scavenging apparatus 15 is not activated, and the air inlet valve 55 is kept closed. The air inlet valve 55 is preferably a normally closed on-off valve (which is closed when not energized).

Next, the operation stopping method for the fuel cell system 10 will be described below referring to a timing chart illustrated in FIG. 3.

The fuel cell system 10 mounted in a fuel cell vehicle (not shown) executes the normal power generation in the foregoing manner, the vehicle runs desirably. When an unillustrated ignition switch (operation switch) is set off, the controller 18 detects the turn-off action as a stop instruction (time t1), and initiates the operation stopping process for the fuel cell system 10.

Figure 4:
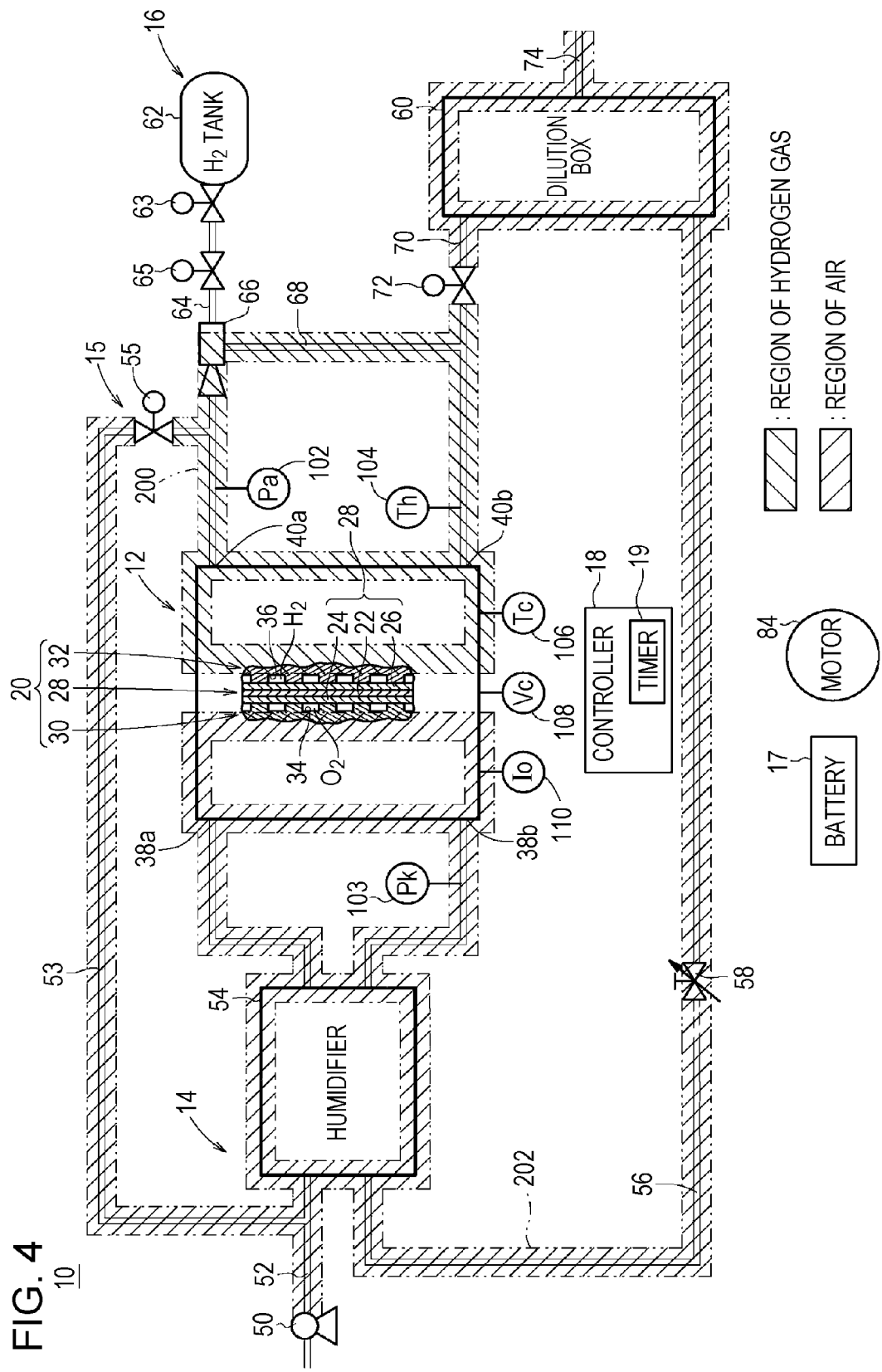
FIG. 4 is an explanatory diagram of a hydrogen-gas volume part and an air volume part in the fuel cell system.

First, after a discharge process (also referred to as "low-oxygen stoichiometric power generating process", "in-stop-mode power generating process", "$O_2$ lean process" or "$O_2$ lean power generating process") to be described later, the supply pressure of the hydrogen gas (fuel gas) is set beforehand so that the fuel-gas pressure (anode pressure Pa) in the fuel cell stack 12 is kept at a set pressure. Specifically, as shown in FIG. 4, a hydrogen-gas volume part 200 which is closed after being filled with the hydrogen gas includes the fuel gas passages 36, the fuel-gas inlet hole 40a and the fuel-gas outlet hole 40b in the fuel cell stack 12, a downstream region downstream of the ejector 66 in the hydrogen supply passage 64, the hydrogen circulation path 68, an upstream region upstream of the purge valve 72 in the off-gas passage 70.

An air volume part 202 which replaces an air atmosphere with a nitrogen atmosphere or an inactive gas includes the oxide gas passages 34, the oxide-gas inlet hole 38a and the oxide-gas outlet hole 38b in the fuel cell stack 12, the air supply passage 52, the air discharge passage 56, the humidifier 54, the dilution box 60 and the storage buffer (not shown).

At the time of the discharge process, air is supplied with an oxygen stoichiometric ratio lower than the oxygen stoichiometric ratio in normal power generation mode. Specifically, the low oxygen stoichiometric ratio is set around a value of 1. It is preferable that the oxygen stoichiometric ratio should fall between 1.2 to 1.8 in normal power generation mode. The supply of the hydrogen gas is stopped at the time of the discharge process.

Accordingly, $nO_2$ or the number of moles of the remaining oxygen in the air volume part 202 which are to be set to a nitrogen atmosphere in the fuel cell stack 12, $n'O_2$ or the number of moles of the oxygen in the humidifier 54, the dilution box 60 and the storage buffer which are to be set to a nitrogen atmosphere by the low oxygen stoichiometric ratio, and $nH_2$ or the number of moles of the remaining hydrogen in the hydrogen-gas volume part 200 are set to have a relation of $2(nO_2+n'O_2)=nH_2$.

Figure 3:
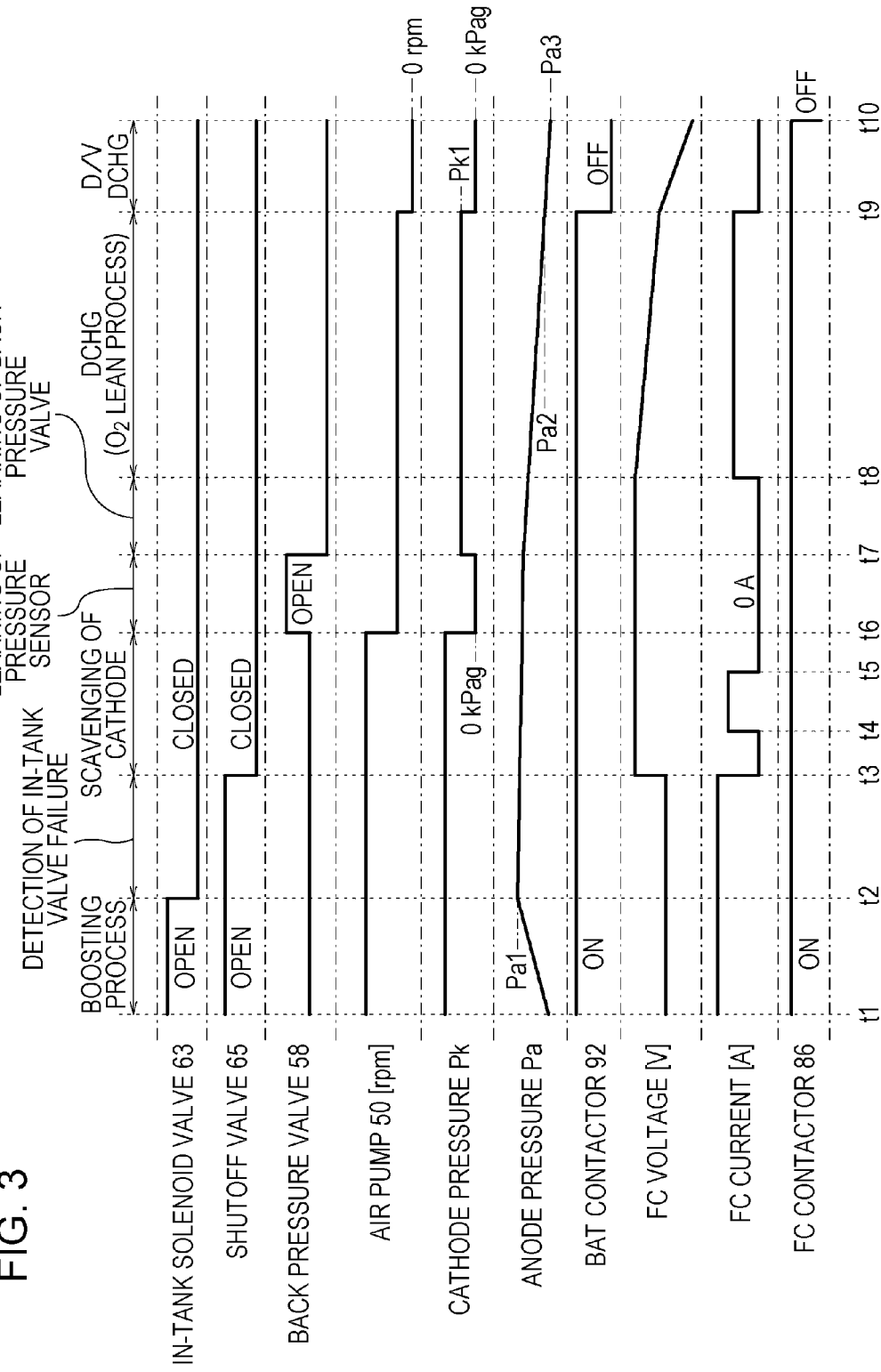
FIG. 3 is a timing chart illustrating the operation stopping method.

The supply pressure (anode pressure), Pa1, of the hydrogen gas is calculated from the set number of moles of the remaining hydrogen $nH_2$ using an equation of $n=P \times V/R \times T$ where n represents the number of moles, P represents the pressure, V represents the volume, R represents a gas constant, and T represents the absolute temperature (see FIG. 3). It is to be noted that the anode pressure Pa1 is set so as to be kept equal to or higher than a constant pressure Pa2 when the discharge process is completed. The constant pressure Pa2 is low enough to prevent hydrogen from running short or being present excessively.

When a relation of (the volume of the air volume part 202)>>(the volume of the hydrogen-gas volume part 200) is fulfilled, it is possible to employ a method of increasing the pressure to the anode pressure Pa1, or a method of supplying hydrogen gas for the deficit hydrogen in order to increase the volume of the hydrogen-gas volume part 200.

When a relation of (the volume of the hydrogen-gas volume part 200)>>(the volume of the air volume part 202) is fulfilled, on the other hand, a method of reducing the pressure to the anode pressure Pa1 is employed to decrease the volume of the hydrogen-gas volume part 200.

When the ignition switch (operation switch) is set off (time t1), as shown in FIG. 3, the hydrogen gas is supplied to the fuel cell stack 12 with the in-tank solenoid valve 63 and the shutoff valve 65 being opened, so that the pressure in the fuel cell stack 12 rises to the anode pressure Pa1 (times t1 to t2: boosting process). This anode pressure Pa1 is calculated by the aforementioned equation.

When the boosting process is terminated (time t2), the in-tank solenoid valve 63 is closed, and the processing shifts to a process of detecting a failure of the in-tank solenoid valve 63. In the failure detecting process, a failure in the in-tank solenoid valve 63 is detected according to the present/absence of a change in pressure directly below the in-tank solenoid valve 63. When the pressure drops, the in-tank solenoid valve 63 is regarded as normal. That is, it is determined that the in-tank solenoid valve 63 is closed properly.

When the failure detecting process for the in-tank solenoid valve 63 is terminated (time t3), a cathode scavenging process is executed. In the cathode scavenging process, a scavenging process based on air (using the oxide-gas supply apparatus 14) is performed to blow off liquid droplets or the like containing water droplets on the cathode side. In this process, power insufficient to drive the air pump 50 which is set to have a high number of rotations [rpm] is supplemented (times t4 to t5).

After the cathode scavenging process, control on the degree of opening of the back pressure valve 58 is temporarily stopped, and the back pressure valve 58 is opened to communicate with the atmosphere, so that the cathode pressure Pk is set to PK=0 [kPag] where g means the gauge pressure (times t6 to t7). Further, when the cathode scavenging process is terminated (time t6), the number of rotations of the air pump 50 included in the oxide-gas supply apparatus 14 is reduced considerably as compared with that in normal operation mode, so that the oxide gas is supplied to with the oxygen stoichiometric ratio being lower than the oxygen stoichiometric ratio in normal operation mode. Specifically, the oxygen stoichiometric ratio is preferably set around 1. Then, a learning process (compensation for 0 point) for the pressure sensor 103 is executed.

Thereafter, the degree of opening of the back pressure valve 58 is adjusted at times t7 to t8 to set the cathode pressure Pk detected by the pressure sensor 103 to a predetermined low pressure Pk1 corresponding to the low oxygen stoichiometric ratio, and a learning process for the back pressure valve 58 at the low pressure Pk1 is executed (times t7 to t8). Thereafter, the cathode pressure Pk is kept set at the low pressure Pk1 until the air pump 50 is turned off (time t9).

Meanwhile, the fuel cell stack 12 keeps generating power (times t1 to t8).

In the low-oxygen stoichiometric power generating process (also referred to as "$O_2$ lean power generating process" or simply as "$O_2$ lean process"; times t8 to t9) after the learning process for the back pressure valve 58 (times t7 to t8), the current (FC current) to be acquired from the fuel cell stack 12 is set to a value which inhibits the hydrogen gas as the fuel gas from passing through the solid polymer electrolyte membrane 22 to move toward the cathode from the anode. At this time, the FC contactor 86 and the battery contactor 92 are set on in FIG. 2, and power obtained when the fuel cell stack 12 generates power is reduced by the DC/DC converter 90 to be charged in the battery 17.

As described above, while air with a low oxygen stoichiometric ratio is supplied to the fuel cell stack 12, the fuel cell stack 12 is generating power with supply of the hydrogen gas being stopped by the closure of the shutoff valve 65 (time t3). The purge valve 72 is also closed. The power generated by the fuel cell stack 12 is supplied to the battery 17 to be discharged (DCHG ($O_2$ lean process) in FIG. 3). When the power generated by the fuel cell stack 12 drops to a predetermined voltage, i.e., to a voltage which cannot be supplied to the battery 17 (substantially the same voltage as the voltage of the battery 17), therefore, the generated power is supplied only to the air pump 50.

Accordingly, while the hydrogen concentration on the anode side drops in the fuel cell stack 12 during the $O_2$ lean process (times t8 to t9), the oxygen concentration on the cathode side drops. Therefore, when the hydrogen pressure (anode pressure Pa) becomes equal to or lower than the predetermined pressure Pa2, for example, the air pump 50 is turned off, and the battery contactor 92 is set off (time t9).

Accordingly, the fuel cell stack 12 generates power according to the reaction of the hydrogen gas and air present inside the fuel cell stack 12 with each other (times t9 to t10). The power that is generated by the power generation of the fuel cell stack 12 is reduced via the down converter 96 to be charged in the 12-V power supply 98 (D/V DCHG in FIG. 3), and the power is supplied to a radiator fan or the like (not shown) as needed. Further, when the voltage generated by the fuel cell stack 12 drops down to near the operational limit voltage of the down converter 96, the FC contactor 86 is set off (time t10). As a result, the fuel cell system 10 goes to an operation stopped state or what is called a soaked state.

As described above, when the ignition switch is set off (time t1), the anode pressure Pa in the fuel cell stack 12 rises to the anode pressure Pa1 before supply of the hydrogen gas is stopped (time t2), and then the back pressure valve 58, the air pump 50, the in-tank solenoid valve 63 and the shutoff valve 65 are actuated. Therefore, the fuel cell stack 12 generates power according to the reaction of the hydrogen gas and air with a low-oxygen stoichiometric ratio, which remain inside the fuel cell stack 12, with each other, and the generated power is supplied to the battery 17 to be discharged (times t2 to t9).

Accordingly, the hydrogen concentration decreases on the anode side in the fuel cell stack 12, and the oxygen concentration decreases on the cathode side, thereby increasing the nitrogen concentration. As a result, a nitrogen gas with a high concentration is produced as an exhaust gas on the cathode side, and the nitrogen gas is supplied to the dilution box 60.

Therefore, the air volume part 202 including the fuel cell stack 12 shown in FIG. 4 can be filled with the nitrogen gas which is an inactive gas.

In addition, the supply pressure of the hydrogen gas to be supplied to the fuel cell stack 12 is increased to the anode pressure Pa1 (time t2) before supply of the hydrogen gas is stopped. This can bring about an effect that low-oxygen stoichiometric power generation ($O_2$ lean process) is carried out properly with the fuel cell stack 12 being filled with an adequate amount of hydrogen, surely preventing an excessive hydrogen gas from remaining inside the fuel cell stack 12 or a hydrogen gas in the fuel cell stack 12 from running short, after discharging is completed.

Further, with the air pump 50 being stopped (time t9), the fuel cell stack 12 is caused to generate power according to a reaction of only hydrogen and oxygen remaining in the fuel cell stack 12 with each other (D/V DCHG in FIG. 3).

Therefore, the nitrogen-gas replacement range in the system is limited within the fuel cell stack 12 when the power generation of the fuel cell stack 12 is carried out while supplying air via the air pump 50, whereas the nitrogen-gas replacement range is expanded to the inlet side of the fuel cell stack 12 when the power generation of the fuel cell stack 12 is carried out after the air pump 50 is stopped. This brings about an advantage that even when the fuel cell system 10 is stopped for a comparatively long period of time, deterioration of the fuel cells 20 on the cathode side can be prevented as much as possible.

There is a case where the concentration of the hydrogen gas on the anode side does not drop so much at the time (t10) when the FC contactor 86 is set off to stop the power generation of the fuel cells 20.

Figure 5:
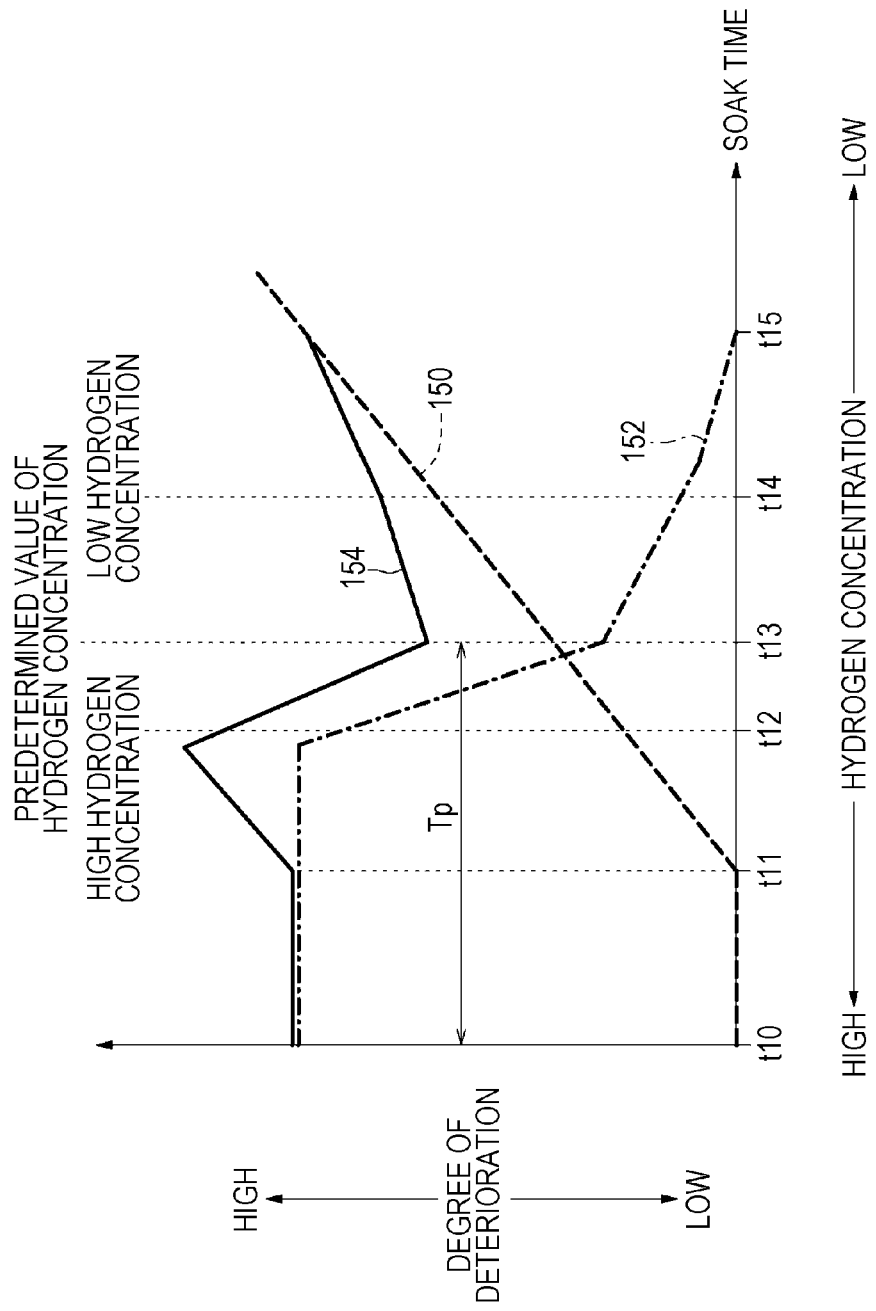
FIG. 5 is an explanatory diagram of the degree of deterioration v.s. a soak time with a hydrogen concentration used as a parameter.

During soaking starting at the time t10 when the FC contactor 86 is set off (when power generation of the fuel cell system 10 (fuel cells 20) is stopped), therefore, the deterioration of the electrolyte membrane/electrode assembly 28 increases in proportion to time, as shown by a deterioration characteristic 150 indicated by a dashed line in FIG. 5, from a time t11 or a predetermined time after the time t10 when soaking has started, due to generation of radicals (OH radicals) or the like which is originated from the cell voltage during soaking being held near the OCV.

Suppressing the deterioration needs a gas replacing process to replace the hydrogen gas in the anode with air by opening the air inlet valve 55 included in the scavenging apparatus 15, and driving the air pump 50 for a given time to intermittently open the purge valve 72 at and after the soak starting time t10 when the FC contactor 86 is set off.

In this in-soak-mode scavenging gas replacing process, however, the deterioration of the electrolyte membrane/electrode assembly 28 changes according to the level of the hydrogen concentration at the time of the initiation of the in-soak-mode scavenging gas replacing process, as shown by a deterioration characteristic 152 indicated by a dashed-dotted line in FIG. 5. That is, the deterioration characteristic shows that the higher the hydrogen concentration, the greater the amount of deterioration of the electrolyte membrane/electrode assembly 28 (the amount of reduction of the power generating efficiency of the fuel cell stack 12).

A deterioration characteristic 154 indicated by a solid line which is the combination (sum) of the deterioration characteristic 150 and the deterioration characteristic 152 shows that the amount of deterioration of the electrolyte membrane/electrode assembly 28 is minimized when the hydrogen concentration of the anode has a predetermined value (at a timing of the soak time=t13−t10=Tp).

It is therefore possible to minimize the degree of deterioration of the electrolyte membrane/electrode assembly 28 by executing the in-soak-mode scavenging gas replacing process to open the air inlet valve 55 and intermittently open the purge valve 72 while driving the air pump 50 for a given time to scavenge the hydrogen gas in the anode with air or the scavenging gas replace the hydrogen gas in the anode with air after a predetermined time (predetermined timing) Tp elapses from the soak starting time t10 when the FC contactor 86 is set off.

Figure 6:
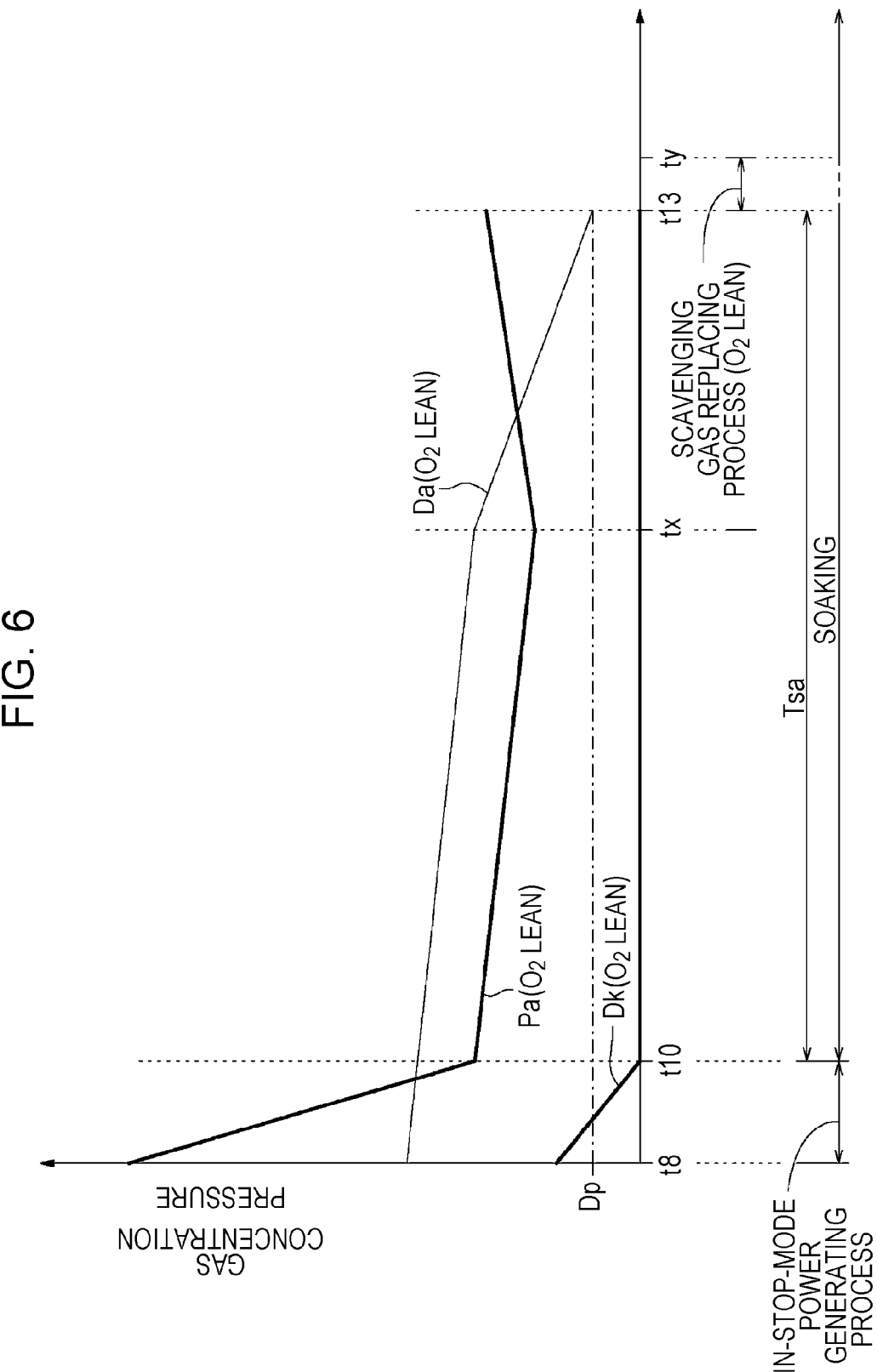
FIG. 6 is an explanatory diagram of the timing for a gas replacing process when a low-oxygen stoichiometric power generating process ($O_2$ lean power generation) is executed.

FIG. 6 shows the characteristics of changes in the gas concentrations (hydrogen gas concentration Da ($O_2$ lean) in the anode and oxygen gas concentration Dk ($O_2$ lean) in the cathode) and the gas pressure (anode pressure Pa ($O_2$ lean)) when the low-oxygen stoichiometric power generating process ($O_2$ lean power generating process) which is the in-stop-mode power generating process is executed (times t8 to t10 (t9)).

A cathode oxygen concentration characteristic Dk ($O_2$ lean) indicated by a thick solid line shows that the oxygen concentration of the cathode decreases during the in-stop-mode power generating process (times t8 to t10), and stays low during soaking (at and after the soak starting time t10).

The anode hydrogen concentration characteristic Da ($O_2$ lean) indicated by a thin solid line has a characteristic to gradually decrease because hydrogen is consumed in power generation during the in-stop-mode power generating process (times t8 to t10). On the other hand, the anode pressure Pa ($O_2$ lean) indicated by a thick solid line has a characteristic to abruptly drop.

The anode pressure Pa ($O_2$ lean) has characteristics such that during soaking (at and after the soak starting time t10), hydrogen is not consumed so that the anode pressure Pa ($O_2$ lean) gradually drop, but when the amount of hydrogen becomes small (time tx), the amount of the nitrogen gas permeating from the cathode side toward the anode becomes large, so that the anode pressure Pa ($O_2$ lean) gradually increases thereafter (times tx to t13).

When an increase in anode pressure Pa ($O_2$ lean) at times tx to t13 causes the anode hydrogen concentration Da ($O_2$ lean) to drop down to a threshold concentration Dp (e.g., value of 0 to 2% or so) (time t13), the in-soak-mode scavenging gas replacing process by the scavenging apparatus 15 is initiated (time t13), and this scavenging gas replacing process ($O_2$ lean) is carried out for a predetermined time (times t13 to ty).

The period of time (times t10 to t13) from the point of time (time t10) when the operation of the fuel cell system 10 is stopped after the in-stop-mode power generating process ($O_2$ lean process) is executed to the point of time when the hydrogen concentration Da ($O_2$ lean) drops down to the threshold concentration Dp can be determined beforehand for each vehicle type, and is stored as a specified time Tsa in the memory in the controller 18.

Figure 7:
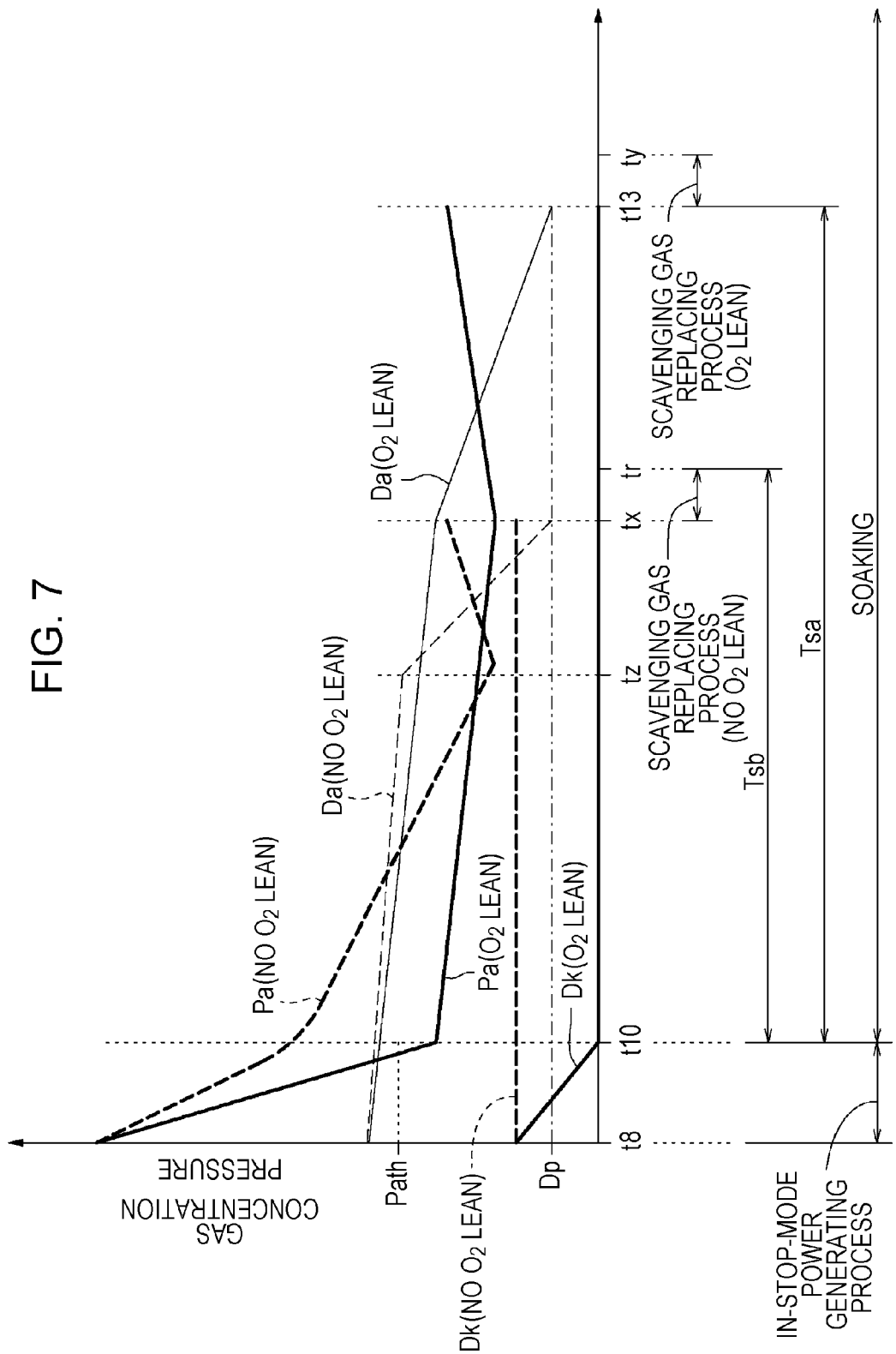
FIG. 7 is an explanatory diagram of the timing for the gas replacing process when the low-oxygen stoichiometric power generating process ($O_2$ lean power generation) is executed in comparison with the timing for the gas replacing process when the low-oxygen stoichiometric power generating process is not executed.

When the in-stop-mode power generating process ($O_2$ lean power generating process) is not executed (when the FC contactor 86 is not set off at the ignition-off time (time t1)), the cathode oxygen concentration Dk is high during soaking (at and after the soak starting time t10), so that if hydrogen permeates from the anode to the cathode, the hydrogen is consumed (reacted) out, and the hydrogen partial pressure difference is not reduced, but the reduction in anode pressure Pa (without $O_2$ lean) or the hydrogen pressure is accelerated, as shown by the individual characteristics of the cathode oxygen concentration Dk (without $O_2$ lean), the anode pressure Pa (without $O_2$ lean) and the anode hydrogen concentration Da (without $O_2$ lean) indicated by dashed lines in FIG. 7. When the amount of hydrogen becomes small (time tz), the amount of oxygen permeation to the anode increases, raising the anode pressure Pa (without $O_2$ lean) and dropping the hydrogen concentration Da (without $O_2$ lean). When the hydrogen concentration Da (without $O_2$ lean) becomes the threshold concentration Dp (time tx), the in-soak-mode scavenging gas replacing process (without $O_2$ lean) by the scavenging apparatus 15 is initiated, and is executed for a predetermined time (times tx to tr).

Therefore, when the anode pressure Pa detected (measured) at the time (time t10) when a predetermined time (t10–t8) elapses from the time t8 when the ignition switch has been turned off is lower than a threshold pressure Path (see FIG. 7), it is possible to determine that the low-oxygen stoichiometric power generation ($O_2$ lean power generation) has been executed.

Note that the threshold pressure Path takes a value which has been confirmed beforehand through simulation and experiments or the like such that the anode pressure Pa ($O_2$ lean) is lower than the threshold pressure Path when the low-oxygen stoichiometric power generation ($O_2$ lean power generation) is executed, but the anode pressure Pa (without $O_2$ lean) does not get lower than the threshold pressure Path when the low-oxygen stoichiometric power generation ($O_2$ lean power generation) is not executed.

The foregoing decision on whether the in-stop-mode power generating process has been executed may be made based on an accumulated current value since the detection of a power-generation stop instruction for the fuel cell 20 until power generation is stopped (times t8 to t9 (may be times t8 to t10) in FIG. 3). In this case, the phenomenon that execution of the in-stop-mode power generating process increases the accumulated current value in a predetermined time (times t8 to t10) is used. Normally, the current sensor 110 detects the current value Io in the fuel cell system 10, so that the cost does not rise so much for calculating the accumulated current value ΣIo of the current value Io.

Figure 8:
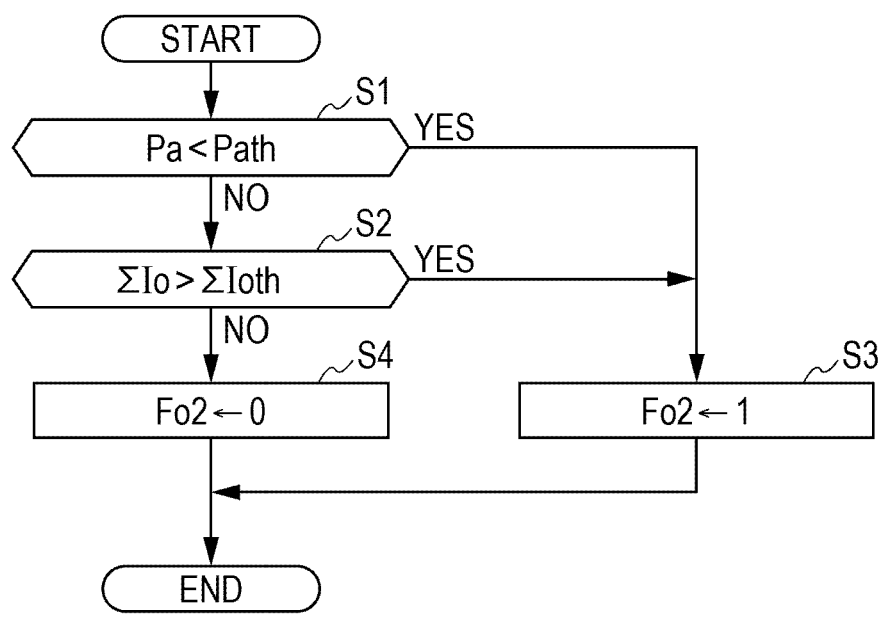
FIG. 8 is a flowchart used to determine whether the low-oxygen stoichiometric power generating process ($O_2$ lean power generation) is executed.

According to the embodiment, as illustrated in a flowchart in FIG. 8, it is determined whether or not the in-stop-mode power generating process ($O_2$ lean process) has been executed during the process of stopping the fuel cell system 10 in a period of time from the point of time at which the ignition switch is set off and the shutoff valve 65 is closed (time t3) to the point of time at which the operation is stopped (time t10).

That is, it is determined in step S1 whether the anode pressure Pa becomes the threshold pressure Path or lower, or it is determined in step S2 whether the accumulated current value ΣIo becomes an accumulated threshold value ΣIoth or lower. When the decision is affirmative, an $O_2$ lean execution flag ($O_2$ lean execution backup flag) Fo2 is set on (Fo2←1), indicating that there is the in-stop-mode power generating process ($O_2$ lean process) in step S3. When both decisions are negative, the $O_2$ lean execution flag Fo2 is set off (Fo2←0), indicating that there is no in-stop-mode power generating process ($O_2$ lean process) in step S4.

Figure 9:
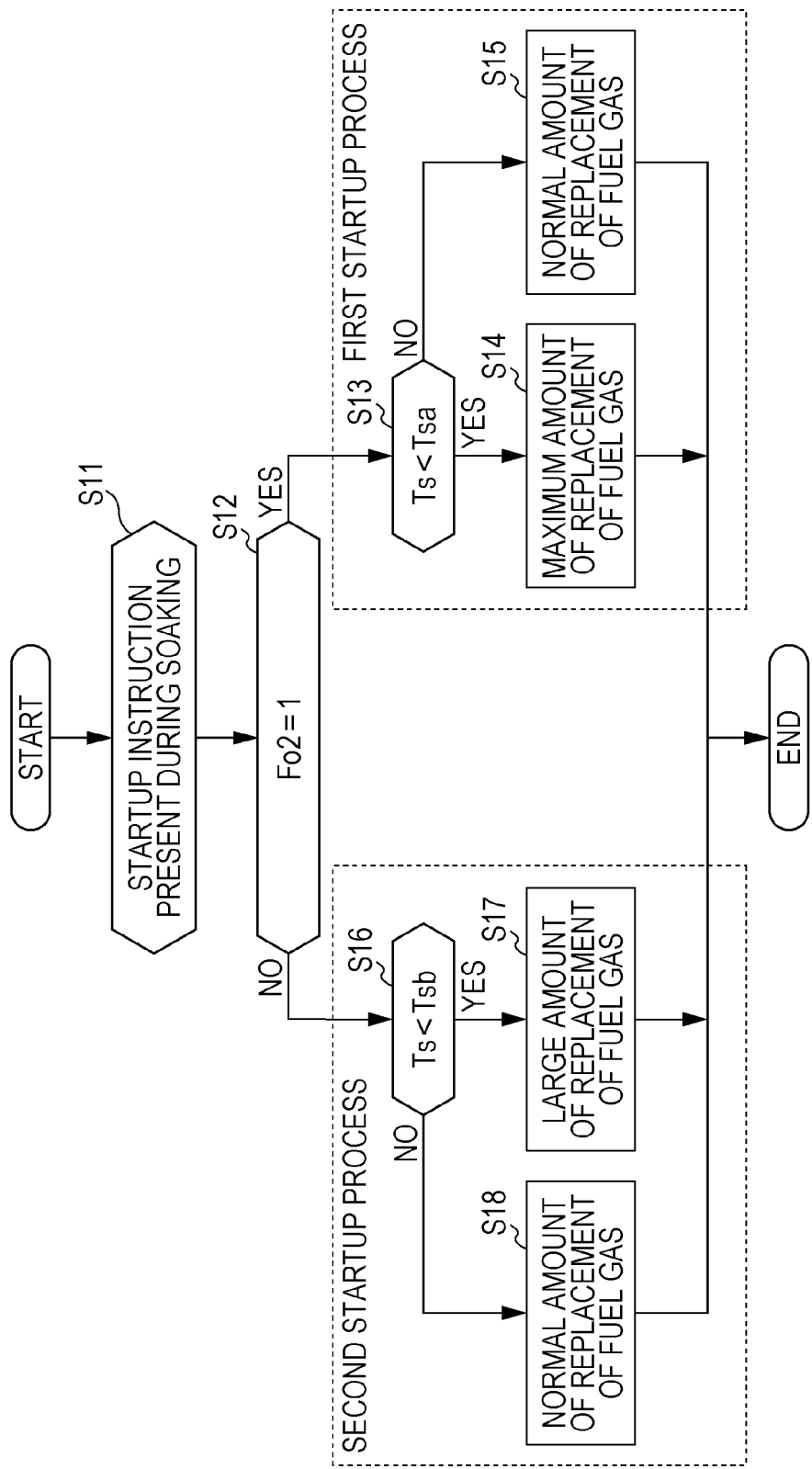
FIG. 9 is a flowchart used to explain an upon-startup process.

Next, referring to a flowchart in FIG. 9, a description will be given of two upon-startup processes (first upon-startup process and second upon-startup process) when the ignition switch (operation switch) is set on (the start instruction is detected) during soaking at and after time t10.

(Description on First Upon-Startup Process)

The first upon-startup process is executed in a case where upon detection of an operation stop instruction for the fuel cell system 10 (time t1), the in-stop-mode power generating process ($O_2$ lean process) is executed, then power generation of the fuel cell system 10 is stopped, and a start instruction to start the fuel cell system 10 is detected after power generation is stopped.

That is, it is detected in step S11 if the start instruction has been generated during soaking. When the start instruction has been generated, it is determined in step S12 whether the $O_2$ lean execution flag Fo2 is Fo2=1.

When the in-stop-mode power generating process has been executed, the $O_2$ lean execution flag Fo2 is Fo2=1, and the upon-startup OCV purge process for the case where the $O_2$ lean process has been executed in and after step S13 is executed.

In this case, when an elapsed time (soak time) is since stopping of power generation of the fuel cell system 10 until detection of the start instruction for the fuel cell system 10 is shorter than the aforementioned specified time Tsa (see FIG. 7) in step S13 (step S13: YES, Ts<Tsa), an upon-startup fuel gas replacing process of setting the amount of replacement of the fuel gas on the anode side upon startup of the fuel cell system 10 larger than that in the case where the elapsed time is longer than the specified time Tsa is executed (step S14). Otherwise (step S13: NO, Ts≥Tsa), the upon-startup fuel gas replacing process is executed with the normal amount of replacement of the fuel gas (step S15).

The upon-startup fuel gas replacing process is executed by opening the in-tank solenoid valve 63 and the shutoff valve 65 to supply a high-pressure hydrogen gas to the hydrogen tank 62 via a pressure control valve (not shown), and intermittently opening the purge valve 72 multiple times to raise the anode pressure Pa to the anode pressure Pa set by the pressure control valve.

When the in-stop-mode power generating process ($O_2$ lean process) is executed, the pressure in the anode is negative and there is a small amount of hydrogen before execution of the scavenging gas replacing process (times t13 to ty), so that deficiency of replacement of hydrogen is suppressed by increasing the amount of replacement of hydrogen (OCV purge amount) upon the next startup. Since the amount of purging can be increased, moisture in the anode can be discharged out of the fuel cell stack 12 (into the dilution box 60) by purging, improving the startup property and stability of power generation. This ensures quicker startup, and improves the merchantability. Even in the case where the in-stop-mode power generating process ($O_2$ lean process) has been executed, when the start instruction is generated after execution of the scavenging gas replacing process (step S13: NO), the gas in the anode is replaced with air, causing the pressure therein to be substantially the atmospheric pressure (because inside the anode is filled with air), so that a smaller amount of replacement of hydrogen (OCV purge amount) is sufficient. The amount of replacement of hydrogen is set small because supply of a large amount of hydrogen may discharge high-concentration hydrogen from the dilution box 60.

(Description on Second Upon-Startup Process)

The second upon-startup process is executed in a case where upon detection of the operation stop instruction for the fuel cell system 10 (time t1), power generation of the fuel cell system 10 is stopped without executing the in-stop-mode power generating process (O₂ lean process), and the start instruction to start the fuel cell system 10 is detected after power generation is stopped.

In this case, it is detected in step S11 if the start instruction has been generated during soaking. When the start instruction has been generated, it is determined in step S12 whether the O₂ lean execution flag Fo2 is Fo2=1.

When the in-stop-mode power generating process has not been executed, the O₂ lean execution flag Fo2 is Fo2=0, and the upon-startup OCV purge process for the case where the O₂ lean process has not been executed in and after step S16 is executed.

In this case, when the elapsed time (soak time) Ts since stopping of power generation of the fuel cell system 10 until detection of the start instruction for the fuel cell system 10 is shorter than the aforementioned specified time Tsa (see FIG. 7) in step S16 (step S16:YES, Ts<Tsa), i.e., when the in-soak-mode scavenging gas replacing process has not been executed during soaking, the amount of the fuel gas used when the upon-startup fuel gas replacing process is executed (the amount of the fuel gas used in step S17) is set less than that in the case where the upon-startup fuel gas replacing process is executed before execution of the in-soak-mode scavenging gas replacing process with the scavenging apparatus after the second procedure is executed (the amount of the fuel gas used in step S14).

In other words, by comparison of the above two cases under the condition that the scavenging gas replacing process has not been executed, when the in-stop-mode power generating process (O₂ lean process) has been executed, the anode pressure Pa is substantially negative (see FIG. 7) as compared with the case where the in-stop-mode power generating process (O₂ lean process) has not been executed, so that the amount of the gas used in step S14 needs to be larger than the amount of the gas used in step S17.

Even in the case where the in-stop-mode power generating process (O₂ lean process) has not been executed (step S12: NO), when the start instruction is generated after execution of the scavenging gas replacing process (step S16: NO), the gas in the anode is replaced with air, causing the pressure therein to be substantially the atmospheric pressure (because inside the anode is filled with air), so that a smaller amount of replacement of hydrogen (OCV purge amount) is sufficient in step S18. The amount of replacement of hydrogen is set small (the same amount as the amount of replacement of the fuel gas in step S15) because supply of a large amount of hydrogen may discharge high-concentration hydrogen from the dilution box 60.

That is, the amount of the fuel gas used (amount of replacement of the fuel gas) is set smaller in the order of step S14, step S17 and step S15 (S18).

The disclosure is not limited to the foregoing embodiment, and may take various configurations based on the contents of the present specification.

According to one aspect of the embodiment, there is provided a control method for a fuel cell system having a fuel cell that generates power according to an electrochemical reaction of an oxide gas supplied to a cathode side with a fuel gas supplied to an anode side, an oxide-gas supply apparatus that supplies the oxide gas to the fuel cell, and a fuel-gas supply apparatus that supplies the fuel gas to the fuel cell. The control method includes, upon detection of an operation stop instruction to stop an operation of the fuel cell, executing an in-stop-mode power generating process of stopping supply of the fuel gas, and supplying the oxide gas to the fuel cell to generate power therefrom, and then stopping power generation of the fuel cell, and upon detection of an operation start instruction to start the fuel cell system after the power generation is stopped, executing an upon-startup fuel gas replacing process of setting larger an amount of replacement of the fuel gas on the anode side at the time of starting the fuel cell system, based on a time elapsed since the stopping of the power generation of the fuel cell until the detection of the operation start instruction to start the fuel cell system, when the elapsed time is shorter than a specified time, as compared with a case where the elapsed time is longer than the specified time.

According to this aspect of the embodiment, upon detection of the operation stop instruction to stop the operation of the fuel cell, the in-stop-mode power generating process of stopping supply of the fuel gas, and supplying the oxide gas to the fuel cell to generate power therefrom, and then stopping power generation of the fuel cell is executed, and upon detection of the operation start instruction to start the fuel cell system after the power generation is stopped, the upon-startup fuel gas replacing process is executed to set larger the amount of replacement of the fuel gas on the anode side at the time of starting the fuel cell system, based on a time elapsed since the stopping of the power generation of the fuel cell until the detection of the operation start instruction to start the fuel cell system, when the elapsed time is shorter than a specified time, as compared with the case where the elapsed time is longer than the specified time.

According to another aspect of the embodiment, there is provided a control method for a fuel cell system having a fuel cell that generates power according to an electrochemical reaction of an oxide gas supplied to a cathode side with a fuel gas supplied to an anode side, an oxide-gas supply apparatus that supplies the oxide gas to the fuel cell, a fuel-gas supply apparatus that supplies the fuel gas to the fuel cell, and a scavenging apparatus that executes an in-soak-mode scavenging gas replacing process of scavenging the anode side with a scavenging gas at a time of soaking after power generation of the fuel cell is stopped, the fuel cell system executing an upon-startup fuel gas replacing process of supplying the fuel gas to the anode side to discharge an anode-off gas when the fuel cell is started. This control method includes a first procedure of, upon detection of an operation stop instruction to stop an operation of the fuel cell, executing an in-stop-mode power generating process of stopping supply of the fuel gas, and supplying the oxide gas to the fuel cell to generate power therefrom, and then stopping power generation of the fuel cell, and a second procedure of stopping the operation of the fuel cell without executing the in-stop-mode power generating process according to the first procedure, the first procedure and the second procedure being selectively executed, wherein upon detection of the operation stop instruction to stop the operation of the fuel cell, an amount of the fuel gas to be used in case of executing the upon-startup fuel gas replacing process before the in-soak-mode scavenging gas replacing process is executed by the scavenging apparatus is set larger than that in a case where the upon-startup fuel gas replacing process is executed after the second procedure is executed and before the in-soak-mode scavenging gas replacing process is executed by the scavenging apparatus.

According to the second aspect of the embodiment, upon detection of the operation stop instruction to stop the operation of the fuel cell, the amount of the fuel gas to be used in case of executing the upon-startup fuel gas replacing process after stopping the operation in which a procedure including the in-stop-mode power generating process (first procedure) is executed and before executing the in-soak-mode scavenging gas replacing process with the scavenging apparatus is set larger than that in the case of executing the upon-startup fuel gas replacing process after stopping the operation in which a procedure including the in-stop-mode power generating process is not executed (the second procedure is executed) and before executing the in-soak-mode scavenging gas replacing process with the scavenging apparatus. This makes it possible to avoid reductions in startup property and stability of power generation which are originated from shortage of the fuel gas amount of startup.

In other words, when the upon-startup fuel gas replacing process is executed based on whether the in-stop-mode power generating process is executed during the process of stopping the operation of the fuel cell system, the amount of the fuel gas to be used in the anode-side gas purge process upon the next startup is set larger, thereby avoiding reductions in startup property and stability of power generation which are originated from shortage of the fuel gas amount of startup.

Obviously, numerous modifications and variations of the present invention are possible in light of the above teachings. It is therefore to be understood that within the scope of the appended claims, the invention may be practiced otherwise than as specifically described herein.

What is claimed is:

1. A method for controlling a fuel cell system having a fuel cell to generate power according to an electrochemical reaction of an oxide gas supplied to a cathode side with a fuel gas supplied to an anode side, an oxide-gas supply apparatus to supply the oxide gas to the fuel cell, and a fuel-gas supply apparatus to supply the fuel gas to the fuel cell, the method comprising:
    an in-stop-mode power generating process of, if an operation stop instruction to stop an operation of the fuel cell is detected, stopping supply of the fuel gas to the fuel cell from fuel-gas supply apparatus, supplying the oxide gas to the fuel cell from the oxide-gas supply apparatus, and stopping power generation of the fuel cell;
    determining whether or not an elapsed time since the stopping of the power generation of the fuel cell until an operation start instruction to start the fuel cell system is detected is shorter than a specified time, if the operation start instruction to start the fuel cell system is detected after the power generation of the fuel cell is stopped;
    setting, as a first amount, an amount of replacement of the fuel gas on the anode side at a time of starting the fuel cell system, if it is determined that the elapsed time is shorter than the specified time; and
    setting, as a second amount, an amount of replacement of the fuel gas on the anode side at the time of starting the fuel cell system, if it is determined that the elapsed time is longer than the specified time, the first amount being larger than the second amount;
    wherein the specified time is defined as a period of time from a point of time when operation of the fuel cell system is stopped after the in-stop-mode power generating process is executed to a point of time when hydrogen concentration drops down to a predetermined threshold concentration.

2. The method according to claim 1, further comprising:
    supplying the fuel gas to the anode side to discharge an anode-off gas based on one of the first amount and the second amount when the fuel cell is started.

3. A method for controlling a fuel cell system having a fuel cell to generate power according to an electrochemical reaction of an oxide gas supplied to a cathode side with a fuel gas supplied to an anode side, an oxide-gas supply apparatus to supply the oxide gas to the fuel cell, a fuel-gas supply apparatus to supply the fuel gas to the fuel cell, and a scavenging apparatus to execute an in-soak-mode scavenging gas replacing process of scavenging the anode side with a scavenging gas at a time of soaking after power generation of the fuel cell is stopped, the fuel cell system being configured to execute an upon-startup fuel gas replacing process of supplying the fuel gas to the anode side to discharge an anode-off gas when the fuel cell is started, the method comprising:
    determining whether an in-stop-mode power generating process is executed since an operation stop instruction to stop an operation of the fuel cell is detected until the fuel cell system is stopped, the in-stop-mode power generating process including stopping supply of the fuel gas, stopping supply of the oxide gas to the fuel cell to generate power from the oxide-gas supply apparatus after the stopping of supply of the fuel gas, and stopping power generation of the fuel cell after the stopping of supply of the oxide gas;
    setting, as a first amount, an amount of the fuel gas to be used in case of executing the upon-startup fuel gas replacing process before an in-soak-mode scavenging gas replacing process is executed by the scavenging apparatus when it is determined that the in-stop-mode power generating process is executed, if the operation stop instruction to stop the operation of the fuel cell is detected; and
    setting, as a second amount, an amount of the fuel gas to be used in case of executing the upon-startup fuel gas replacing process before the in-soak-mode scavenging gas replacing process is executed by the scavenging apparatus when it is determined that the in-stop-mode power generating process is not executed, if the operation stop instruction to stop the operation of the fuel cell is detected, the first amount being larger than the second amount; and
    determining whether or not an elapsed time since the stopping of the power generation of the fuel cell until an operation start instruction to start the fuel cell system is detected is shorter than a specified time, if the operation start instruction to start the fuel cell system is detected after the power generation of the fuel cell is stopped, wherein the setting of the first amount includes setting the first amount if it is determined that the elapsed time is shorter than the specified time, and
    the setting of the second amount includes setting the second amount if it is determined that the elapsed time is shorter than the specified time;
    wherein the specified time is defined as a period of time from a point of time when operation of the fuel cell system is stopped after the in-stop-mode power generating process is executed to a point of time when hydrogen concentration drops down to a predetermined threshold concentration.

4. The method according to claim 3, further comprising:
    setting, as a third amount, an amount of the fuel gas to be used in case of executing the upon-startup fuel gas replacing process before the in-soak-mode scavenging gas replacing process is executed by the scavenging apparatus when it is determined that the in-stop-mode power generating process is executed, if the operation stop instruction to stop the operation of the fuel cell is detected and if it is determined that the elapsed time is longer than the specified time, the first amount being larger than the third amount; and
    setting, as a fourth amount, an amount of the fuel gas to be used in case of executing the upon-startup fuel gas replacing process before the in-soak-mode scavenging gas replacing process is executed by the scavenging apparatus when it is determined that the in-stop-mode power generating process is not executed, if the operation stop instruction to stop the operation of the fuel cell is detected and if it is determined that the elapsed time is longer than the specified time, the second amount being larger than the fourth amount.

5. The method according to (claim 1), wherein the predetermined threshold concentration is predetermined based on a vehicle type.

6. The method according to (claim 3), wherein the predetermined threshold concentration is predetermined based on a vehicle type.

* * * * *